(12) United States Patent
Camisasca (10) Patent No.: US 8,051,690 B2
(45) Date of Patent: Nov. 8, 2011

(54) ANTI-THEFT THREADED CAP

(75) Inventor: Henry P. Camisasca, Irvine, CA (US)

(73) Assignee: Camisasca Automotive Manufacturing, Inc., Lake Forest, CA (US)

( * ) Notice: Subject to any disclaimer, the term of this patent is extended or adjusted under 35 U.S.C. 154(b) by 0 days.

(21) Appl. No.: 12/724,263

(22) Filed: Mar. 15, 2010

(65) Prior Publication Data

US 2011/0214461 A1 Sep. 8, 2011

Related U.S. Application Data

(60) Provisional application No. 61/310,567, filed on Mar. 4, 2010.

(51) Int. Cl.
*F16B 41/00* (2006.01)

(52) U.S. Cl. ............. 70/232; 70/229; 70/259; 411/432; 411/910

(58) Field of Classification Search .............. 70/229, 70/230, 232, 259, 260; 411/432, 910; D8/397
See application file for complete search history.

(56) References Cited

U.S. PATENT DOCUMENTS

| | | | |
|---|---|---|---|
| 1,152,960 A | 9/1915 | Moloney | |
| 1,604,690 A * | 10/1926 | Edwin | ............................. 70/231 |
| 1,673,486 A | 6/1928 | Berge | |
| 2,345,949 A | 2/1942 | Robbins | |
| 2,316,695 A * | 4/1943 | Harry | ............................. 411/337 |
| 4,214,505 A | 7/1980 | Aimar | |
| 4,302,137 A | 11/1981 | Hart | |
| 4,400,123 A | 8/1983 | Dunegan | |
| 4,413,374 A | 11/1983 | Ferdinand et al. | |
| 4,521,146 A | 6/1985 | Wharton | |
| 4,582,462 A | 4/1986 | Thiel | |
| D284,265 S | 6/1986 | Resan | |
| 4,601,624 A | 7/1986 | Hill | |
| 4,611,379 A | 9/1986 | Heitzman | |
| 4,621,230 A | 11/1986 | Crouch et al. | |
| 4,701,089 A | 10/1987 | Nettel | |
| 4,726,723 A | 2/1988 | Bainbridge | |
| 4,732,517 A | 3/1988 | Crouch et al. | |
| 4,786,224 A * | 11/1988 | Wharton | ........................... 411/1 |
| D359,294 S | 6/1995 | Szabo | |
| D359,295 S | 6/1995 | Szabo | |
| D359,970 S | 7/1995 | Szabo | |
| 5,517,730 A | 5/1996 | Ho | |
| D380,668 S | 7/1997 | Nakamura | |
| 5,653,564 A | 8/1997 | Nakamura | |
| D386,068 S | 11/1997 | Nakamura | |
| 5,752,795 A | 5/1998 | D'Adamo | |
| 5,870,934 A | 2/1999 | Cullinan | |

(Continued)

OTHER PUBLICATIONS

U.S. Appl. No. 29/352061, filed Dec. 15, 2009, Camisasca.

(Continued)

*Primary Examiner* — Suzanne Barrett (74) *Attorney, Agent, or Firm* — Knobbe, Martens, Olson & Bear LLP (57) ABSTRACT

An anti-theft device is provided for inhibiting access to a fastener, and more specifically to a fastener head. The anti-theft device can include a base member with an opening for receiving the fastener and a lid member releasably coupled to the base member. The lid member can include a specialized tool recess adapted for receiving a specialized tool, such that only the specialized tool can be used to open and close the lid member.

24 Claims, 12 Drawing Sheets

U.S. PATENT DOCUMENTS

| | | | |
|---|---|---|---|
| 5,890,859 A | 4/1999 | Hasnik | |
| 5,997,229 A | 12/1999 | Akers | |
| D432,006 S * | 10/2000 | Hussaini | D8/397 |
| 6,135,691 A | 10/2000 | Nadarajah et al. | |
| 6,273,658 B1 | 8/2001 | Patterson et al. | |
| 6,494,658 B1 | 12/2002 | Roy | |
| D483,252 S | 12/2003 | Williamson | |
| 6,719,511 B2 | 4/2004 | Notaro et al. | |
| 6,923,230 B2 | 8/2005 | Airoldi et al. | |
| 7,004,701 B2 | 2/2006 | Ross | |
| 7,351,020 B1 | 4/2008 | Notaro et al. | |
| 7,445,414 B1 | 11/2008 | Notaro et al. | |
| D608,626 S | 1/2010 | Camisasca | |
| 2008/0044254 A1 | 2/2008 | Wilson | |

OTHER PUBLICATIONS

APR Performance Inc., Product Image, Walnut, CA, undated, in 1 page.

McGard, LLC, Product Image, Orchard Park, NY, undated, in 1 page.

* cited by examiner

ANTI-THEFT THREADED CAP

CROSS-REFERENCE TO RELATED APPLICATIONS

This application claims benefit under 35 U.S.C. §119(e) to U.S. Provisional Patent Application No. 61/310,567, filed Mar. 4, 2010, which is incorporated in its entirety by reference herein.

BACKGROUND OF THE INVENTIONS

1. Field of the Invention

The present application is directed generally toward anti-theft devices, and specifically toward anti-theft devices which inhibit or prevent access to fasteners.

2. Description of the Related Art

Anti-theft devices are used by manufacturers and/or consumers, such as for example in the automotive industry, to prevent unwanted access to parts or components. For example, anti-theft devices such as boots are commonly used on car tires to prevent auto theft. Anti-theft devices such as key locks or other types of locks are also commonly used to inhibit access to and prevent tampering of automotive compartments.

SUMMARY OF THE INVENTION

An aspect of at least one of the embodiments disclosed herein includes the realization that theft of components which are secured by fasteners has become increasingly more common. For example, in the automotive context, theft of fastener-secured license plates has become increasingly more common as the value of such plates increases. Thus, it would be advantageous to have an anti-theft device or devices which could aid the manufacturer and/or consumer in protecting license plates or other components which require fasteners. For example, it would be advantageous to have a device that inhibits access to a fastener or fasteners, and which can easily be removed and/or replaced by the manufacturer and/or consumer without being easily removed and/or replaced by others.

Thus, in accordance with at least one embodiment disclosed herein, an anti-theft device can comprise a lid member comprising a threaded lid member attachment portion and a recess for receiving a specialized tool, and a base member configured to be releasably coupled to the lid member, the base member comprising a base having an opening for receiving the end of a fastener, a wall extending from the base, and a threaded base member attachment portion along the wall.

In accordance with at least another embodiment disclosed herein, a method for preventing theft of a fastener can comprise providing an anti-theft device comprising a generally rounded lid member having a recess along a top portion for receiving a specialized tool, and a cup-like base member configured to couple with the lid member by threaded engagement, the base member having an opening along its bottom surface for receiving the end of a fastener. The method can further comprise inserting a fastener through the opening and tightening the fastener against an object with sufficient force to secure the fastener to the object but still allow the base member to rotate about the fastener head, inserting a specialized tool into the recess of the lid member, and attaching the lid member to the base member by rotating the specialized tool.

BRIEF DESCRIPTION OF THE DRAWINGS

These and other features and advantages of the present embodiments will become more apparent upon reading the following detailed description and with reference to the accompanying drawings of the embodiments, in which.

DETAILED DESCRIPTION OF THE PREFERRED EMBODIMENTS

For convenience, the embodiments disclosed herein are described in the context of an anti-theft device for use with license plates on a commercial automobile. However, the embodiments can also be used with other products and/or components which are fastened. For example, the embodiments can be used to inhibit access to fasteners on military vehicles and large trucks, and/or on equipment or stationary objects which require fastening of one component to another. The embodiments can be used in residential buildings, with bathroom fixtures, walls, and dispensers. Various other uses may also be possible.

Various features associated with different embodiments will be described below. All of the features of each embodiment, individually or together, can be combined with features of other embodiments, which combinations form part of this disclosure. Further, no feature is critical or essential to any embodiment.

With reference to FIGS. 1-4, an anti-theft device 10 can comprise a device for substantially surrounding and/or retaining the head of a fastener so as to limit access to the fastener head. For example, an anti-theft device 10 can comprise a lid member 12 and base member 14. The lid member 12 and base member 14 can various sizes and shapes. In some embodiments, both the lid and base member can have a generally circular or cylindrical shape. The lid member 12 can be releasably coupled to the base member 14, such as for example by threaded engagement. The lid member 12 can be completely removed from the base member 14. Both the lid member 12 and base member 14 can be made from the same type of material. For example, in some embodiments, the lid and base members 12, 14 can be comprised of plastic, such as low friction Delrin plastic, polypropylene, PED, or other suitable plastic. In some embodiments, one or more of the lid member and base members 12, 14 can be comprised of aluminum, bright and/or polished stainless steel, or other types of metal. Other materials are also possible. In some embodiments, the lid member 12 can be comprised of a different material than the base member 14. In some embodiments, the lid member 12 can comprise components which are made from different materials. Similarly, in some embodiments, the base member 14 can comprise components which are made from different materials. The lid member 12 and/or base member 14 can be injected molded, machined, stamped, a combination of these or made by other suitable manufacturing methods.

With reference to FIGS. 5-8, the lid member 12 can comprise a generally rounded (e.g. circular) member having a generally smooth convex outer surface 16 along a top portion of the lid member 12. Other shapes and sizes for the lid member 12 are also possible. The convex surface 16 can be slick and difficult to grasp. In some embodiments, the convex surface 16 can have a generally dome shape. In some embodiments, the convex surface 16 can comprise a sloped surface with no substantially flat areas, especially those that extend along an axis of rotation, such as axis A. Because of its shape and/or contour, the convex surface 16 can make it difficult to grip the lid member 12 by hand, or with a pliers or other tool separately from the base such that it can be rotated relative to the base, and remove the lid member 12 from base member 14.

The lid member 12 can further comprise a tool engagement area 18 for insertion of a tool, which in some cases may be a specialized tool. The specialized tool can comprise, for example, a specialized screwdriver, specialized wrench, or other suitable device with a head portion specially shaped to fit within and/or engage the tool engagement area 18. In some embodiments, the specialized tool can comprise a custom-made tool (e.g. unique) made specifically for, and intended for use with, a particular device 10. In some embodiments, the specialized tool can comprise an anti-theft tool already in existence on the market (e.g. a tamper-resistant TORX star screwdriver or one-way drive), which is not commonly used by the general public. In some cases, a specialized tool may not be specifically designed to be theft-resistant, but may simply be uncommon in the location in which the device 10 is used. For example, square drive, regular TORX star drive, tri-wing, spanner head, spline drive, etc. may be considered specialized tools because they are not commonly used by the general public. The specialized tool can differ from ordinary conventional type tools such as standard screwdrivers, Phillips head screwdrivers, and hex keys, which are common and readily-available. In contrast to these ordinary tools, the specialized tool described herein can be more difficult to obtain or locate, and in some cases, can generally only be obtained by purchasing a kit containing the tool and the device 10 or visiting or ordering the specialized tool from the manufacturer or seller of the device 10.

Figure 1:
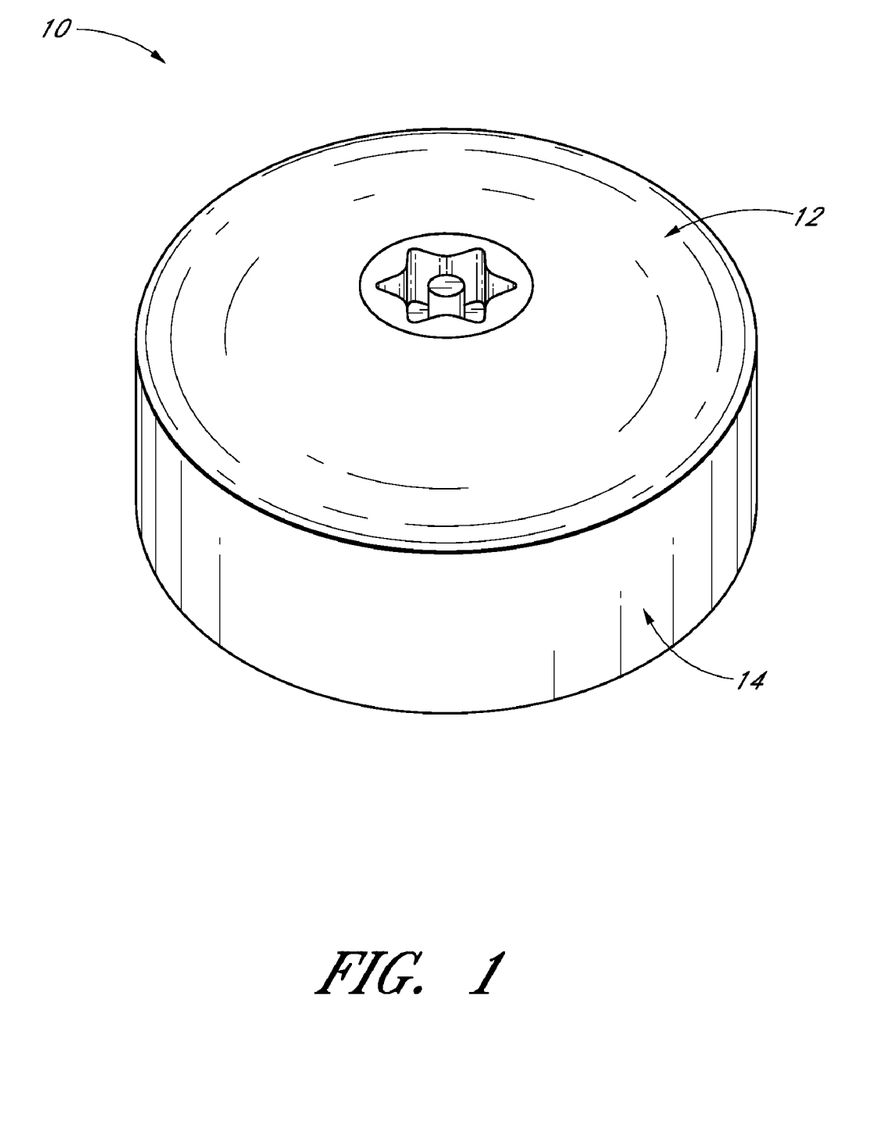
FIG. 1 is a front and top side perspective view of an embodiment of an anti-theft device having a pin-in star shaped design.
Figure 2:
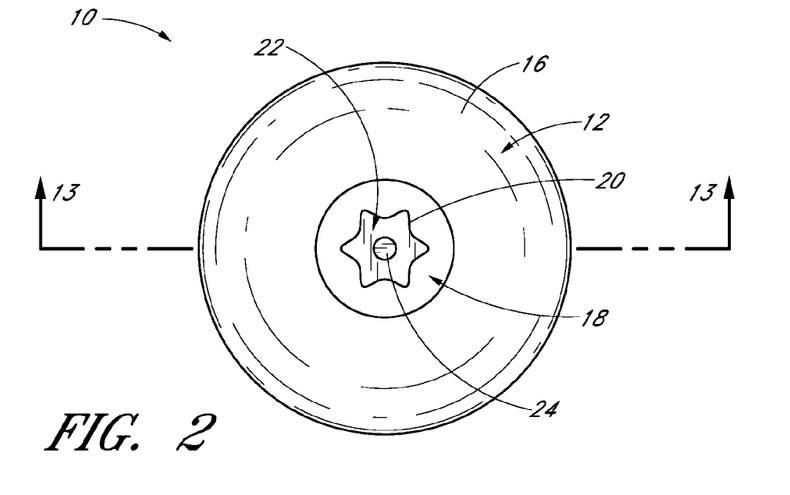
FIG. 2 is a top plan view of the anti-theft device of FIG. 1.
Figure 3:
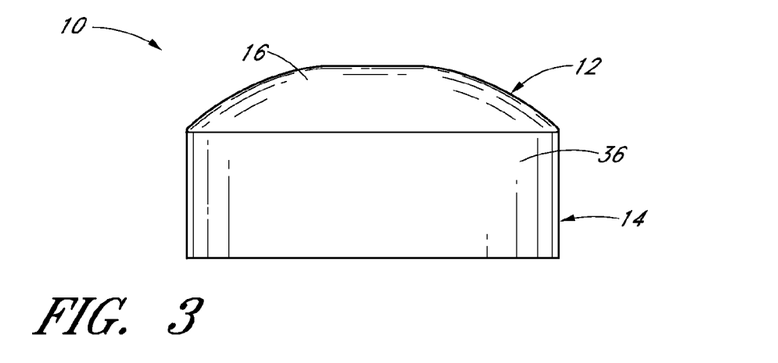
FIG. 3 is a front elevational view of the anti-theft device of FIG. 1.
Figure 4:
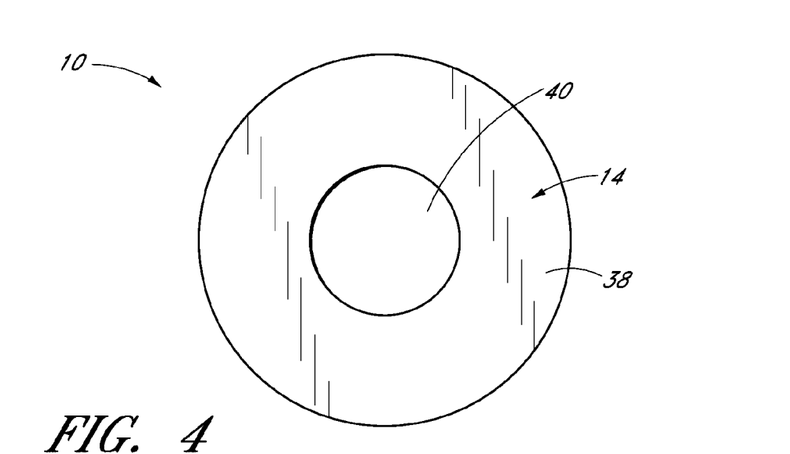
FIG. 4 is a bottom plan view of the anti-theft device of FIG. 1.
Figure 5:
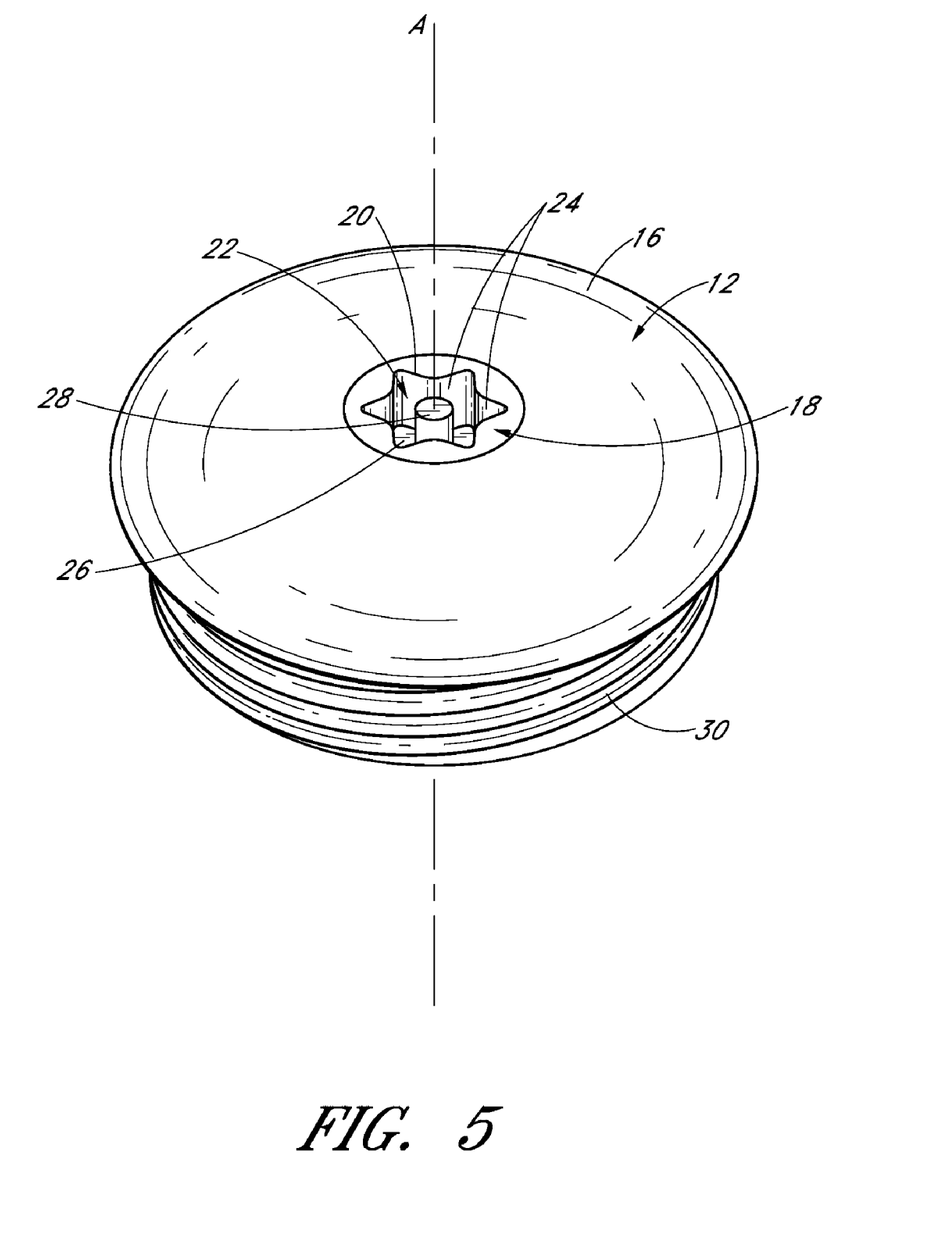
FIG. 5 is a front and top side perspective view of the anti-theft device of FIG. 1, showing only a lid member.
Figure 6:
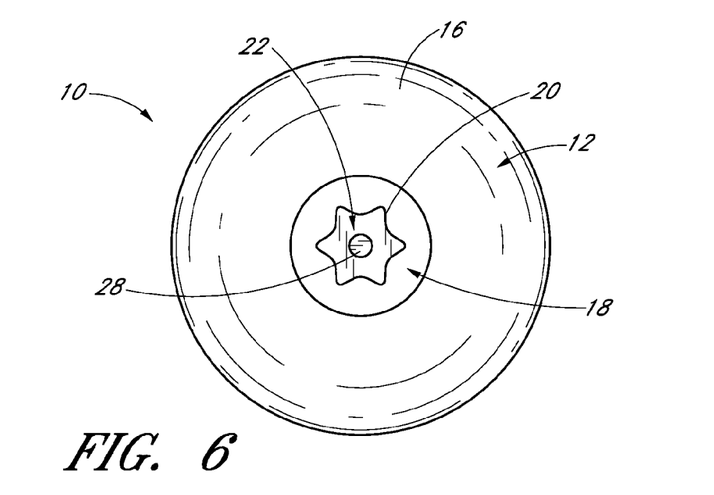
FIG. 6 is a top plan view of the lid member.

The tool engagement area 18 can, in some embodiments, include a generally flat area adjacent the surface 16 on top of the lid member 12. The tool engagement area 18 can be located anywhere on the lid member 12, though preferably near a central area on top of the lid member 12. The tool engagement area 18 can comprise an edge 20 surrounding a recess 22. The recess 22 can form a specialized shape. For example, the recess 22 shown in FIG. 5 has a generally star-like shape, and can be referred to as a pin-in star-shaped design. The recess 22 can comprise walls 24, and a bottom surface 26. The walls 24 and bottom surface 26 can be designed so as to receive the end of a specialized tool. In some embodiments, the recess 22 can extend axially generally along the axis A of the lid member 12. While one size and shape of recess is shown in FIG. 5, various other sizes and shapes can also be used. For example, FIGS. 15-19 show various other embodiments of a device 10 with different shaped recesses 22.

The specialized shape and size of the recess 22 can inhibit a potential thief from using a conventional tool or device to remove the lid member 12. For example, it may be difficult or impossible to insert a conventional tool (e.g. a common screwdriver) into the recess 22 of device 10 due to the size and shape of the recess 22. Thus, only a specialized tool, specifically fitted to be inserted into the recess 22 and to contact the walls 24 and/or bottom surface 26, can be used to remove the lid member 12. A manufacturer of an automobile, or of a license plate or other component, could sell such a specialized tool to a user upon purchase of the device 10, or could provide the user with the information needed to obtain such tool. The specialized tool could be sold at specific service centers. In some embodiments, the specialized tool could be sold as part of a kit that includes at least the specialized tool and the device 10. The user of the automobile, license plate, or other object for use with the device 10 could carry the specialized tool with himself or herself, and use it to open the lid member 12 when needed, such as for example when removal of the fastener is desired or a new fastener is required.

Figure 20:
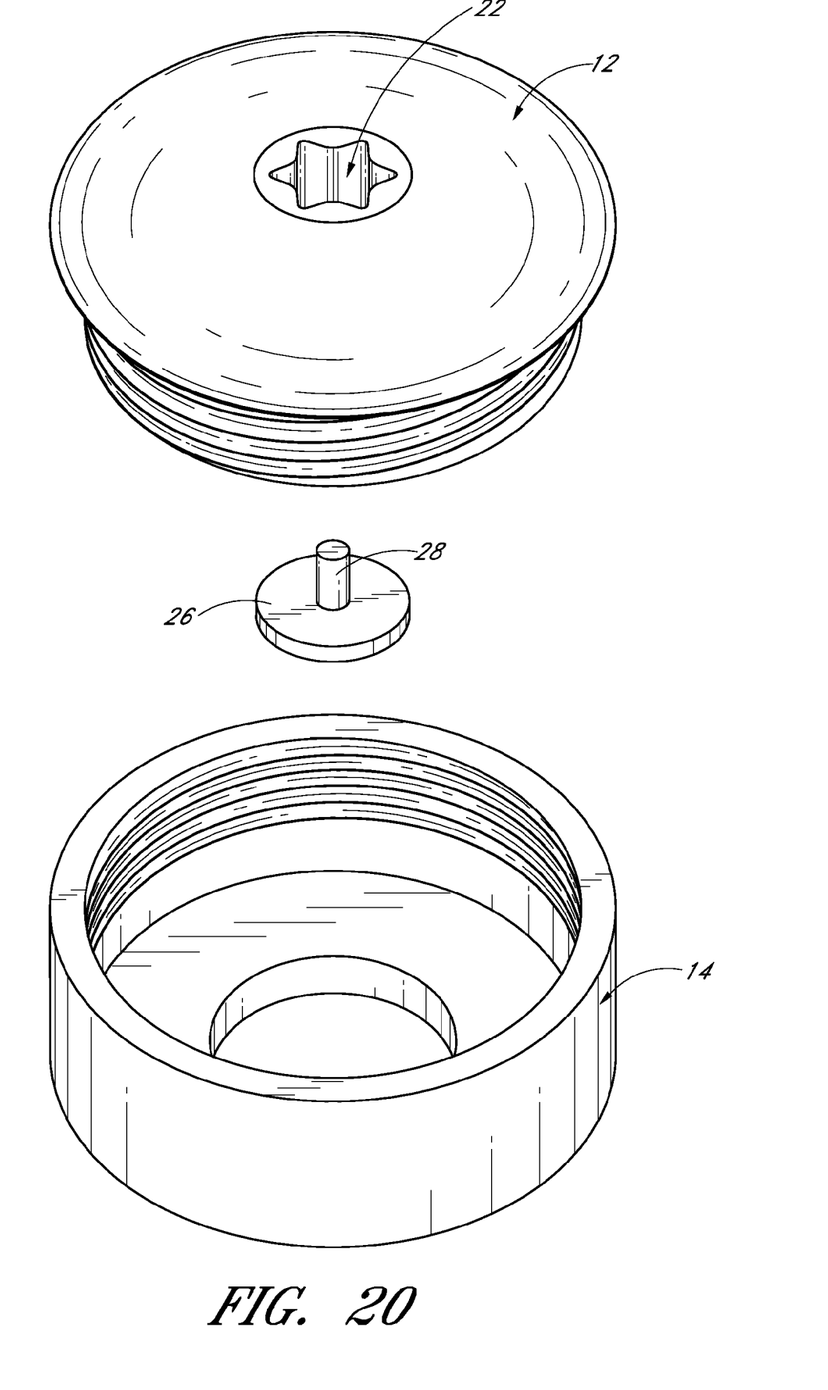
FIG. 20 is a perspective exploded view of another embodiment of an anti-theft device having a separately formed protrusion.

With continued reference to FIG. 5, the tool engagement area 18 can further comprise a protrusion 28. The protrusion 28 can comprise, for example, a pin, a boss or other knob-like piece of material. The protrusion 28 can extend axially along the axis A. In some embodiments, the protrusion 28 can be located within the center of the recess 22. The protrusion 28 can be integrally formed with the lid member 12, or can be a separate piece attached to the lid member 12. In some embodiments, such as that shown in FIG. 20, the protrusion 28 and/or bottom surface 26 can be formed separately and then attached to the lid member 12, such as for example by press-fit, spot welding, or adhesion. In some embodiments, the protrusion 28 can be formed by a knurling or coining process. The protrusion 28 can define a boundary of the recess 22. In some embodiments, such as for example shown in FIG. 13, the protrusion 28 can extend up to the edge of surface 16. In some embodiments, the protrusion can extend only partially up to the edge of surface 16, or beyond the edge of surface 16.

Along with the size and shape of the recess 22, the protrusion 28 can also make it difficult for a potential thief to insert a common tool or device into the recess 22 in order to turn or twist the lid member 12. For example, in some embodiments, without the protrusion 28 a potential thief may be able to grip the walls 28 within recess 22 with a conventional tool (e.g. screwdriver) or with a knife or other device, and turn the lid member 12 until it unscrews and separates from the base member 14. With the addition of the protrusion 28, it can be more difficult for a potential thief to access the recess 22.

Figure 7:
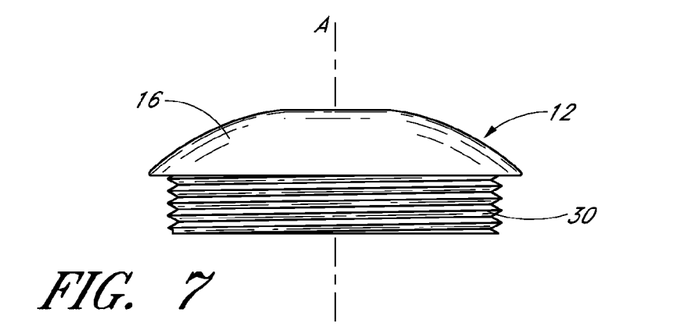
FIG. 7 is a front elevational view of the lid member.
Figure 8:
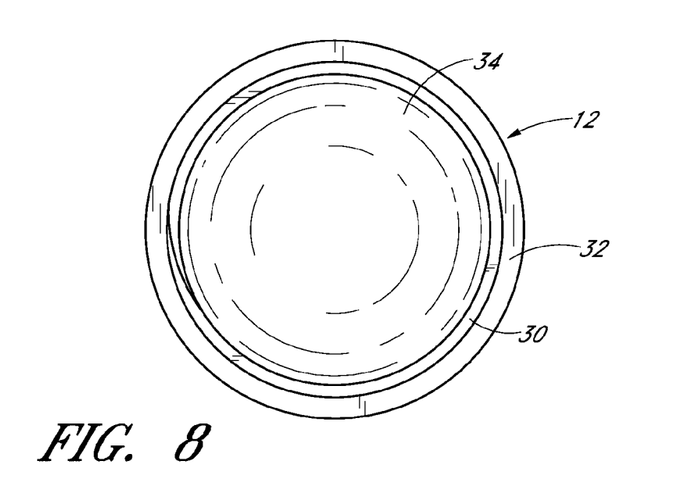
FIG. 8 is a bottom plan view of the lid member.

With reference to FIG. 7, the lid member 12 can further comprise a lid member attachment portion 30 for attaching the lid member 12 to the base member 14. In some embodiments, the lid member attachment portion 30 can comprise a set of threads extending underneath the surface 16. The threads can be wound in a right-hand or left-hand direction, and can comprise, for example, single or double threads. The lid member attachment portion 30 can be used to rigidly and securely attach the lid member 12 to the base member 14, thereby making it difficult to remove the lid member 12 without unscrewing the lid member 12 from the base member 14 after insertion of a specialized tool.

With continued reference to FIG. 7, the lid member 12 can further comprise a lid member lip portion 32. The lid member lip portion 32 can extend circumferentially around the lid member 12, and can contact and/or seal against a corresponding area on the base member 14 when the lid member 12 has been tightened (e.g. screwed) into place. The lid member lip portion 32, when in tight contact with the base member 14, can inhibit access to the interior of the base member 14.

Figure 13:
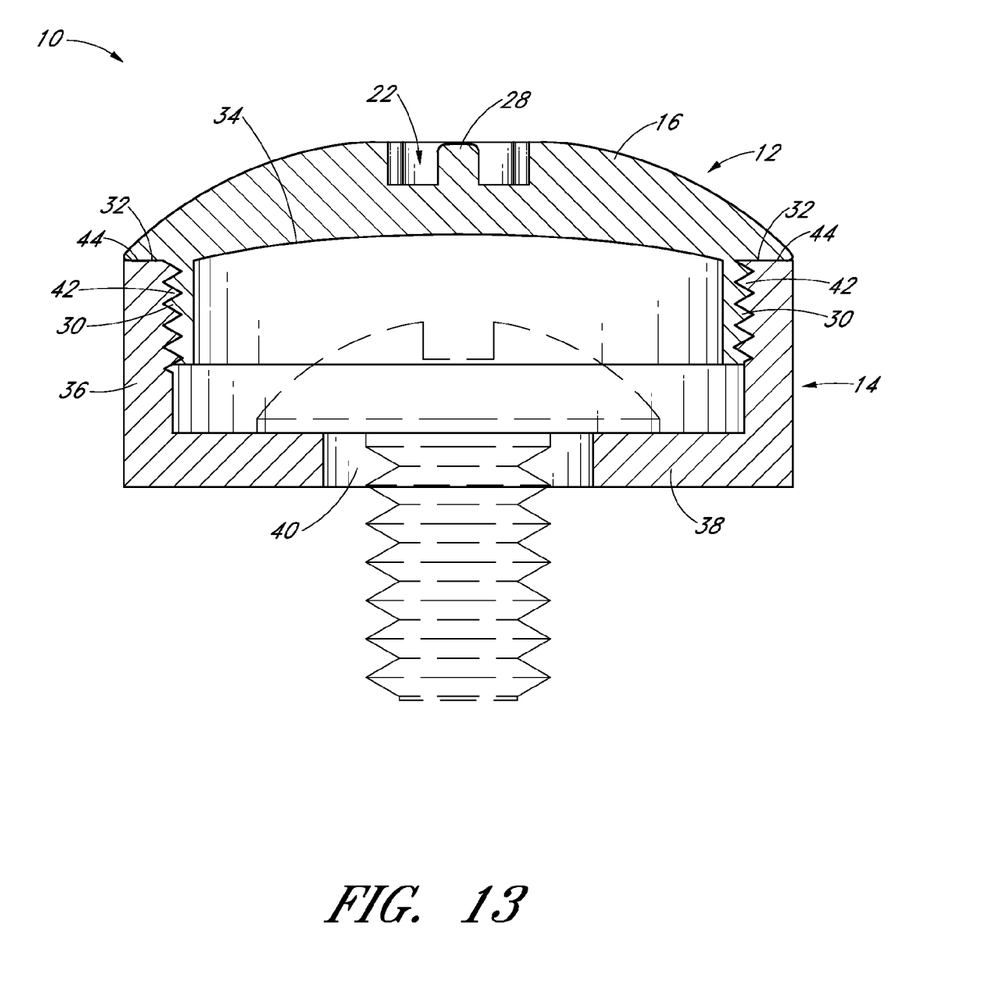
FIG. 13 is a cross-sectional view of the anti-theft device of FIG. 1.

With reference to FIGS. 7 and 13, the lid member 12 can further comprise an interior surface 34. The interior surface 34 can be located opposite surface 16, and can be concave in nature. The interior surface 34 can face towards the interior of the base member 14 when the lid member 12 and base member 14 are coupled together. The interior surface 34 can be concave to accommodate a fastener (e.g. a steel fastener) head with a convex surface, such as that shown in FIG. 13. Other shapes and configurations for interior surface 34 are also possible. For example, other shapes and sizes of fastener heads can dictate various other configurations of the interior surface 34, such that the interior surface 34 generally remains out of contact with the fastener head.

With reference to FIGS. 9-12, the base member 14 can comprise a generally rounded (e.g. cylindrical) member having a generally cup-like shape. Other shapes and sizes for the base member 14 are also possible. The base member 14 can comprise an exterior wall 36 that extends circumferentially around the interior of the base member 14. In some embodiments, the base member 14, and/or lid member 12 can have a diameter that ranges between approximately 15-17 millimeters. In some embodiments, the base member 14 can be approximately 16 millimeters in diameter. Other sizes and diameters outside of this range are also possible.

The base member 14 can comprise a base 38. The wall 36 can extend from the base 38. In some embodiments, the base 38 can be integrally formed with the wall 36, whereas in other embodiments the base 38 can be formed separately from the wall 36 and coupled thereto, such as for example by adhesive or welding. The base 38 can comprise an opening 40. For example, the opening 40 can extend through the base 38, and can be sized and shaped so as to facilitate insertion of at least a portion of a fastener through the base member 14. For example, the opening 40 can be sized and shaped so as to allow insertion of a threaded portion of a fastener (e.g. the end of a screw), but not the head of the fastener, thereby causing the head of the fastener to rest against and/or be restrained by the base 38 and surrounding wall 36.

Figure 9:
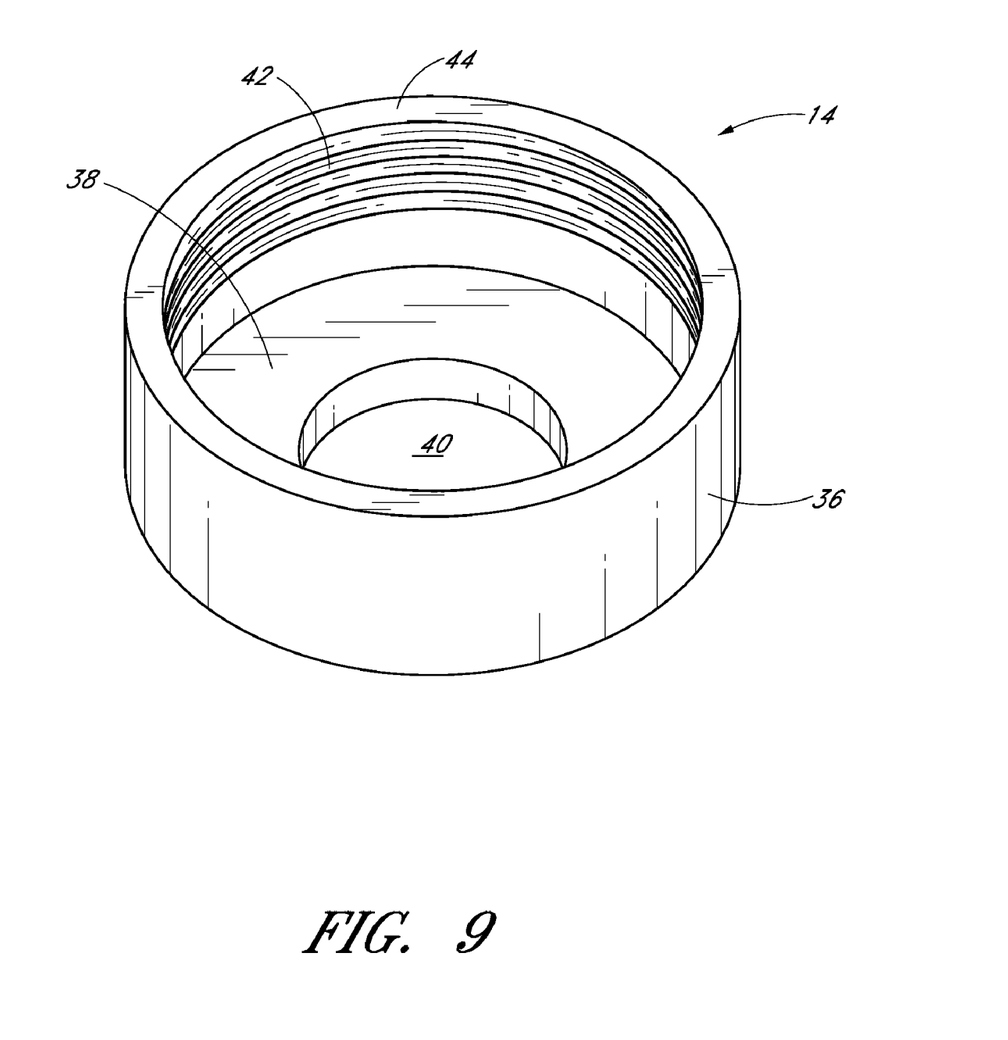
FIG. 9 is a front and top side perspective view of the anti-theft device of FIG. 1, showing only a base member.
Figure 10:
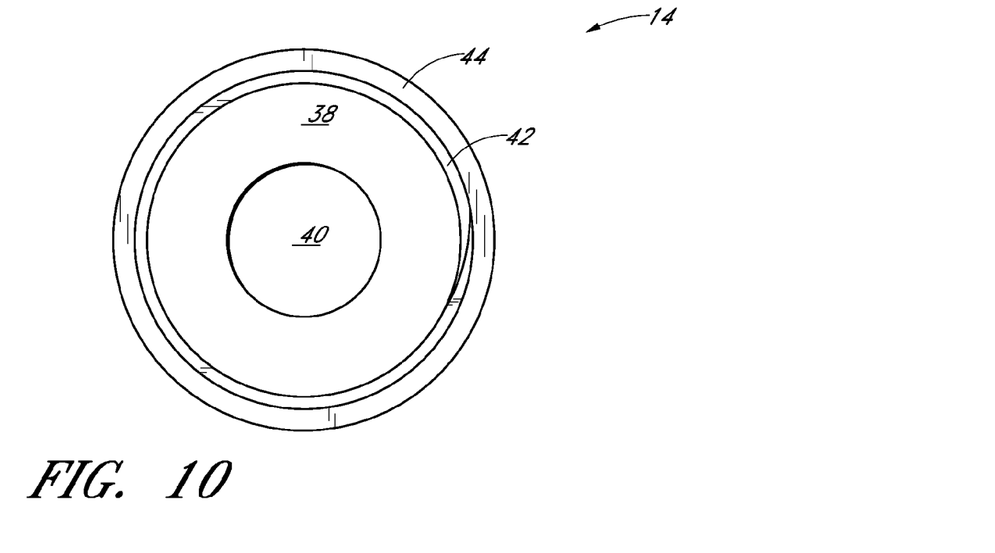
FIG. 10 is a top plan view of the base member.
Figure 11:
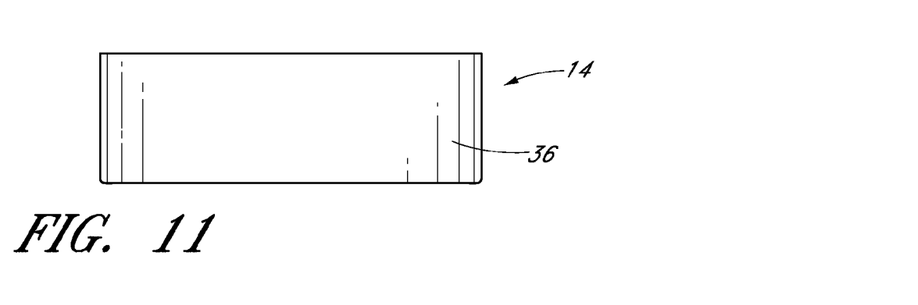
FIG. 11 is a front elevational view of the base member.
Figure 12:
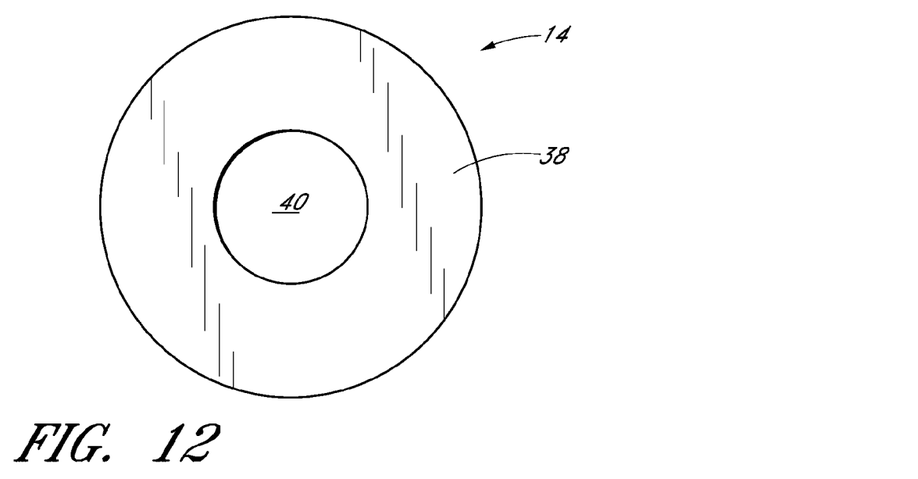
FIG. 12 is a bottom plan view of the base member.

With continued reference to FIG. 9, the base member 14 can comprise a base member attachment portion 42 for attaching the base member 14 to the lid member 12. In some embodiments, the base member attachment portion 42 can comprise a set of threads extending at least partially along an interior of the wall 36. The threads can be wound in a right-hand or left-hand direction, and can comprise, for example, single or double threads. The base member attachment portion 42 can contact and/or mate with the lid member attachment portion 30. The base member attachment portion 42 can be used to rigidly and securely attach the base member 14 to the lid member 12, thereby making it difficult to remove the lid member 12 without unscrewing the lid member 12 from the base member 14 after insertion of a specialized tool.

With continued reference to FIG. 9, the base member 14 can further comprise a base member lip portion 44. The base member lip portion 44 can extend circumferentially around the base member 14, and can contact and/or seal against a corresponding area on the lid member 12, such as for example the lid member lip portion 32, when the lid member 12 has been tightened (e.g. screwed) into place. The base member lip portion 44, when in tight contact with the lid member 12, can inhibit access to the interior of the base member 14.

Figure 14:
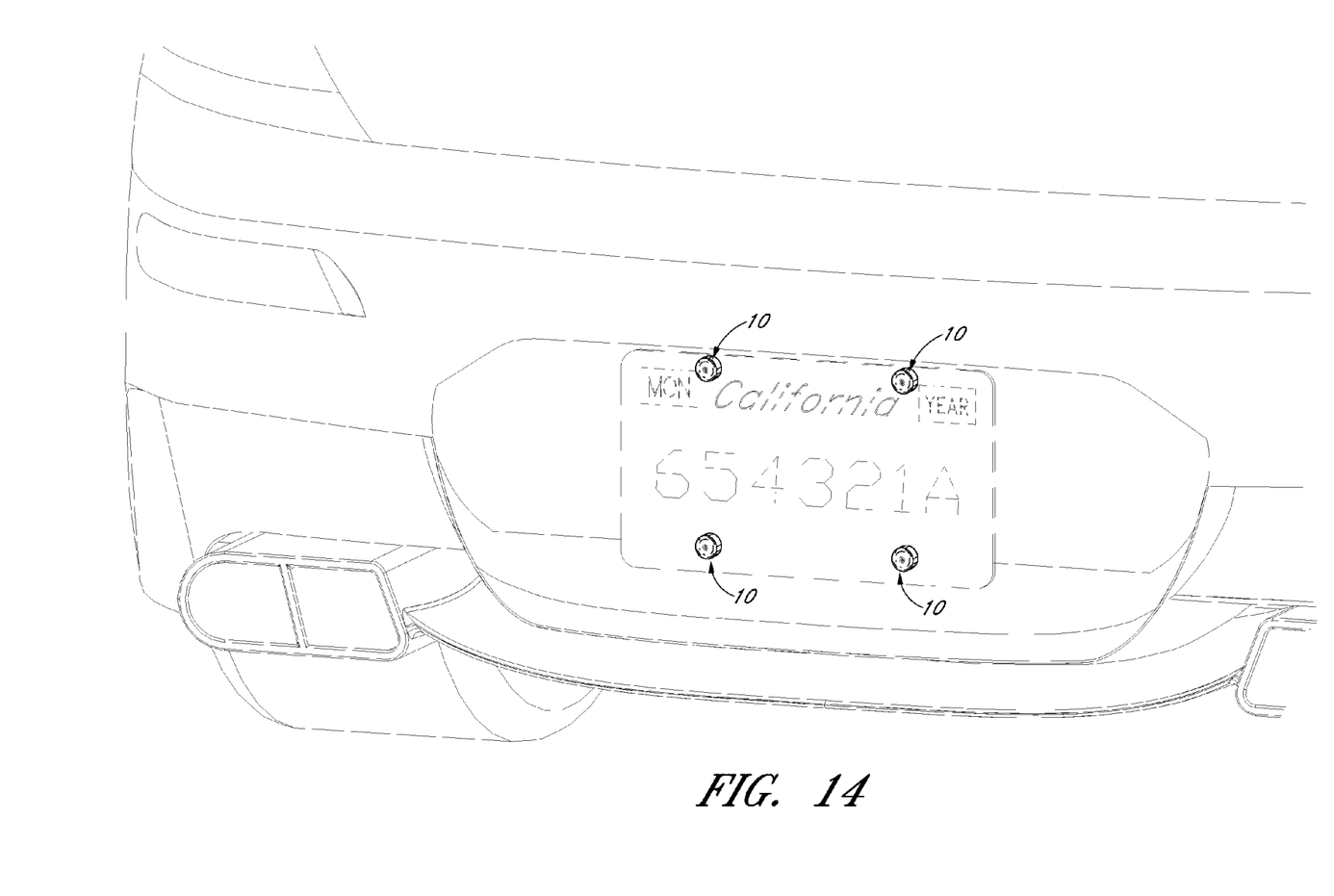
FIG. 14 is a perspective view of four of the anti-theft device of FIG. 1 as used, for example, on license plate hardware.
Figure 15:
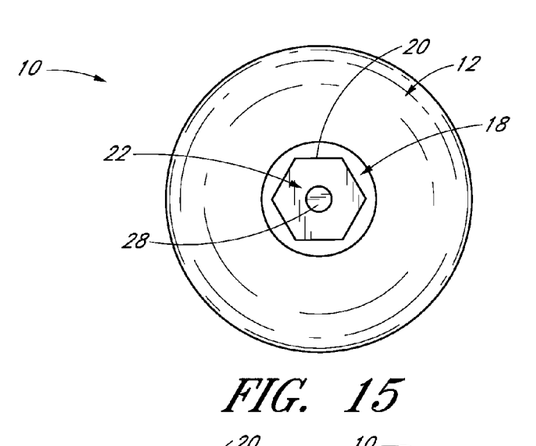
FIG. 15 is a perspective view of another embodiment of an anti-theft device having a pin-in hex shaped design.
Figure 16:
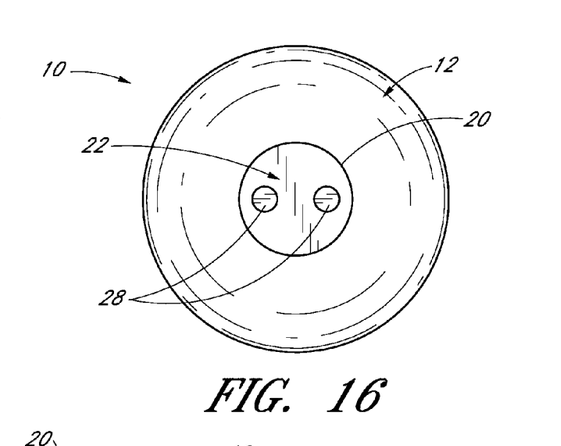
FIG. 16 is a perspective view of another embodiment of an anti-theft device having a drilled spanner shaped design.
Figures 17, 18:
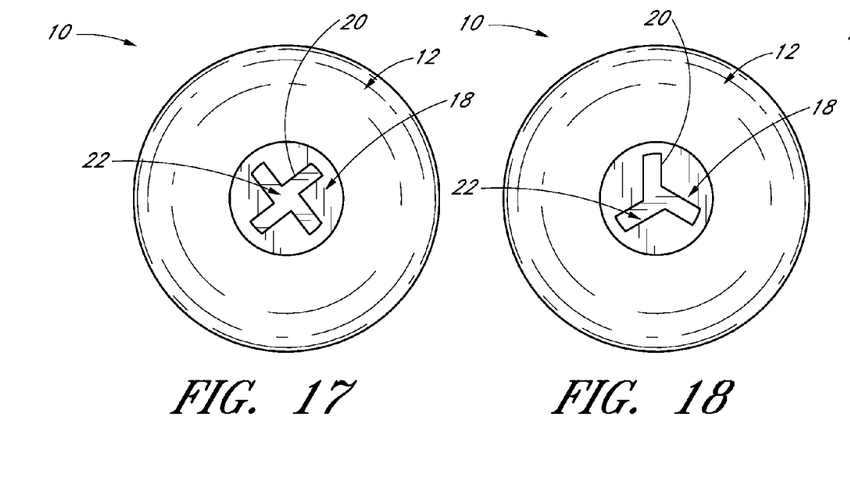
FIG. 17 is a perspective view of another embodiment of an anti-theft device having a torq set design.
FIG. 18 is a perspective view of another embodiment of an anti-theft device having a tri-wing design.
Figure 19:
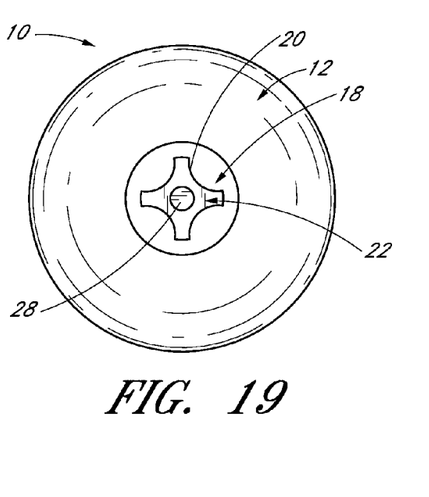
FIG. 19 is a perspective view of another embodiment of an anti-theft device having a Phillips pin-in design.

With reference to FIGS. 13 and 14, an embodiment of a use of the device 10 is illustrated. The end of a fastener can first be placed through the opening 40 of base member 14. Once placed through the opening 40, the fastener head can be turned and tightened, and the license plate or other item can be fastened in place against a vehicle frame. The fastener can be tightened to a degree such that the fastener head presses tightly against the base 38, and the base 38 is held firmly against the vehicle frame or other object by frictional engagement. In this type of embodiment, the base 38 can act as a washer.

In other embodiments, the fastener head can be tightened such that the license plate or other item is secured, but not so tight as to prevent rotational movement of the base member 14. For example, and with reference to FIG. 13, the fastener shown in dashed lines can be secured to a license plate, but the pressure between the fastener head and base 38, if any, and the pressure between the base 38 and license plate, if any, can be light enough to still allow the base member 14 to rotate relative to the fastener head and license plate about axis A. In this embodiment, the fastener head and license plate can remain fixed in one position, while the base member 14 can spin or rotate. This spinning or rotating can inhibit theft, for example, by making it more difficult to grip and unscrew the lid member 12 from the base member 14. In some embodiments, the surface of base 38 can be smooth and hard such that friction with the fastener head remains low, thus allowing the base member 14 to turn. For example, in some embodiments the base 38 can be comprised of Delrin plastic, Teflon®, nylon, stainless steel, or other suitable material. In some embodiments, the base member 14 can have a durometer hardness of between approximately 80 and 85. Other ranges and/or types of material are also possible. Additionally, in some embodiments coatings or other methods of lowering the friction can alternatively or additionally be used.

Figure 13A:
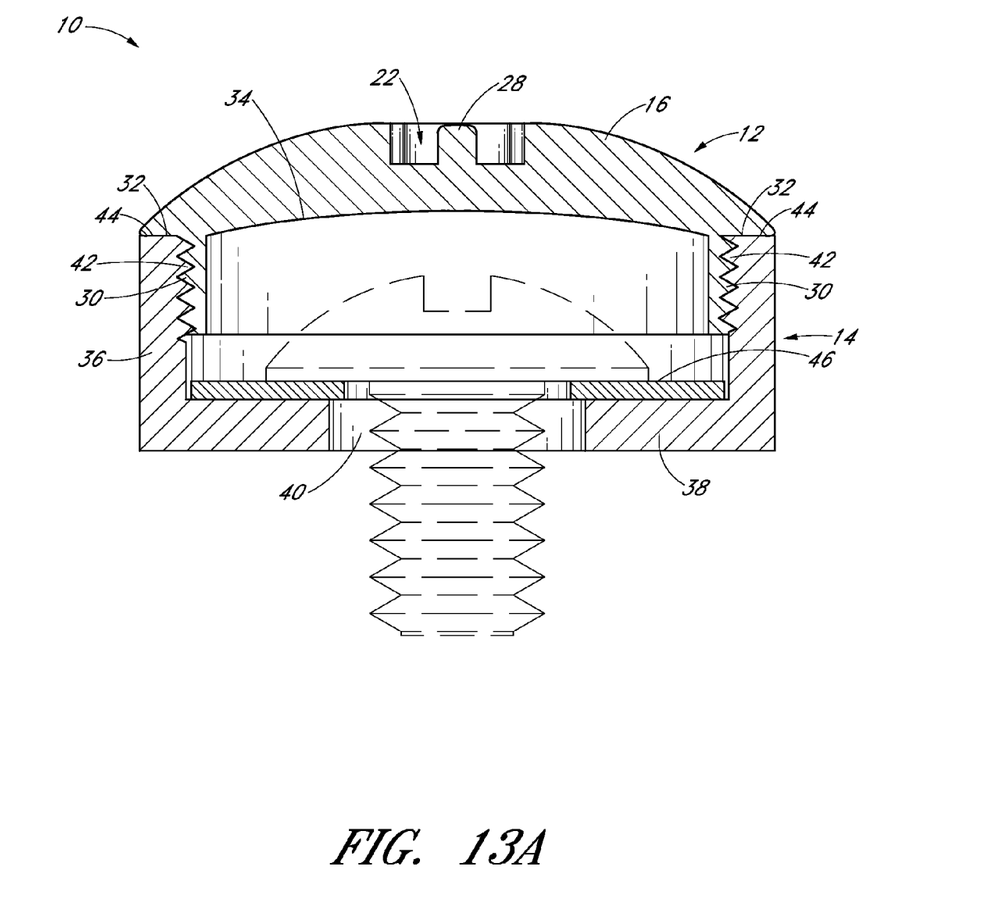
FIG. 13A is a cross-sectional view of the anti-theft device of FIG. 1, further including a washer positioned inside the device.
Figure 13B:
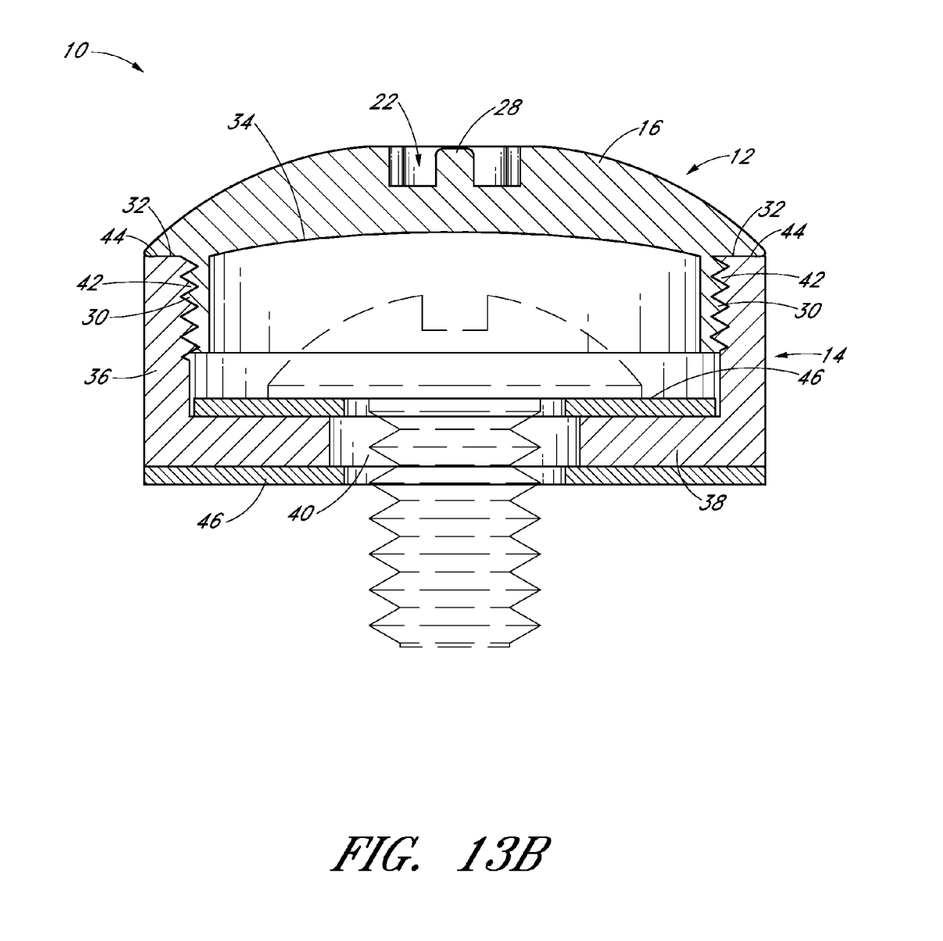
FIG. 13B is a cross-sectional view of the anti-theft device of FIG. 1, further including two washers, one positioned inside the device and another outside the device.

With reference to FIGS. 13A and 13B, in some embodiments the device 10 can comprise a washer or washers 46. The washers 46 can facilitate spinning or rotation of the base member 14 relative the fastener head. For example, a single washer 46 can be placed at the bottom of a Delrin plastic base member 14, and underneath the head of a steel fastener. The washer 46, which can be comprised of PTFE, Teflon®, Delrin plastic, nylon, or other suitable low friction material, can facilitate rotation of the base member 14 relative the fastener head after the fastener head has been securely tightened. The base member 14, washer, 46, and/or fastener head can further comprise a smoothness and/or hardness that facilitates such relative movement. In some embodiments, a washer can alternatively or additionally be placed between the base member 14 and the license plate (or other object to which the device is attached). The washer 46 located outside of the device 10 can further facilitate rotation of the base member 14 relative to the fastener head after the fastener head has been securely tightened.

With continued reference to FIGS. 13 and 14, once the fastener has been secured, the lid member 12 can be coupled to the base member 14. For example, the lid member 12 can be placed against the base member 14, with the lid member attachment portion 30 and base member attachment portion 42 aligned. In some embodiments, the base member 14 can be held, such as for example with a pair of piers, while the lid member 12 is coupled to and/or removed from the base member 14. The user's specialized tool can be inserted into recess 22, thereby contacting the walls 24, bottom surface 26, and/or protrusion 28, and can be used to couple the lid member 12 to the base member 14. For example, the specialized tool can be turned, thereby causing the lid member attachment portion 30 to contact the base member attachment portion 42. The lid member 12 can be screwed onto or otherwise attached to the base member 14 with use of the specialized tool.

Once the lid member 12 has been coupled to the base member 14, the fastener head can be housed within the confines of the device 10, out of reach from a potential thief. The inner surface 34 can be spaced away from the fastener head, thereby preventing interference with the fastener head. The lid member lip portion 32 and base member lip portion 44 can be in contact and/or sealed against one another, further preventing access to the fastener head. In order to again gain access to the fastener head, the specialized tool can be inserted into recess 22 again and used to remove the lid member 12.

As illustrated in FIG. 13, more than one device 10 can be used on a license plate or other object. Furthermore, the device 10 can be small and compact enough to inhibit destruction of the aesthetic appearance of the license plate or other object. In some embodiments, the surface 16 or entire lid member 12 can be decorated and/or designed so as to blend in with the object it is intended to be used with. For example, the lid member 12 (or the entire device 10) can be made white to blend in with a white license plate frame. In some embodiments, the surface 16 can include markings or designs which signify the manufacturer of the device 10, of the license plate, or of any other product or service. In some embodiments, the device 10 can be used as advertisement for the vehicle for which it can be used. Additionally, in some embodiments, the device 10 can include markings or designs specialized or specific to the individual user.

While the device 10 described herein is described in the context of a two-part device (lid member 12 and base member 14), in other embodiments the device 10 can include one part or more than two parts. For example, in some embodiments the lid member 12 can be hingedly coupled to the base member 14. In some embodiments the lid member 12 and base member 14 can be connected with a lanyard such that the lid member 12 is not accidentally dropped and/or lost during assembly or replacement of a fastener. In some embodiments, the base member 14 described herein can be formed integrally with, or in connection with, a license plate, marquis plate, license plate frame, or any other object that is intended to be fastened. For example, instead of having separate devices 10, the license plate in FIG. 14 can include base members 14 already formed in the license plate.

Furthermore, while the device 10 described herein is described as having a single recess for receiving the specialized tool, in some embodiments the device 10 can have a protrusion or protrusions, more than one recess, or a combination of one or more protrusions and recesses adapted for receiving a specialized tool to remove and/or attach the lid member 12.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combinations or sub-combinations of the specific features and aspects of the embodiments can be made and still fall within the scope of the inventions.

It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

This is claimed:

1. An anti-theft kit comprising:
   an anti-theft device comprising:
      a lid member comprising a top surface that defines an outermost surface of the device, a threaded lid member attachment portion extending underneath the top surface, and a specially formed recess on the top surface for receiving a specialized tool;
      a base member configured to be releasably coupled to the lid member, the base member comprising a base having an opening for receiving the end of a fastener, a wall extending from the base towards the lid member, and a threaded base member attachment portion along the wall configured to connect with the threaded lid member attachment portion;
      wherein the base member and the lid member form a cavity that receives and accommodates the head of the fastener; and
   a specialized tool adapted for use with the lid member;
   wherein the base member is configured to rotate relative to a fastener head received within the base member.

2. The kit of claim 1, wherein the lid member attachment portion comprises threads along a lower portion of the lid member, and the base member attachment portion comprises threads along the wall of the base member.

3. The kit of claim 1, wherein the lid member comprises a smooth outer convex surface.

4. The kit of claim 1, wherein the lid member comprises an inner concave surface.

5. The kit of claim 1, wherein the base member has a generally cylindrical configuration.

6. The kit of claim 1, wherein the recess comprises a pin-in star-shaped design.

7. The kit of claim 1, wherein the recess comprises a pin-in hex design.

8. The kit of claim 1, wherein the recess comprises a drilled spanner design.

9. The kit of claim 1, wherein the recess comprises a torq set design.

10. The kit of claim 1, wherein the recess comprises a tri-wing design.

11. The kit of claim 1, wherein the recess comprises a Phillips pin-in design.

12. The kit of claim 1, further comprising a protrusion within the recess.

13. The kit of claim 12, wherein the protrusion is formed separately from the lid member and is affixed to the lid member.

14. The kit of claim 1, wherein the anti-theft device further comprises a washer positioned within the base member and alongside the base of the base member.

15. The kit of claim 1, wherein the recess comprises walls, and the specialized tool is configured to contact the walls of the recess in order to unscrew the lid member from the base member.

16. The kit of claim 1, wherein the base member has a generally cylindrical shape having a diameter of approximately 16 millimeters.

17. A method of preventing theft of a fastener comprising:
providing an anti-theft device comprising:
a generally rounded lid member having a recess along a top portion for receiving a specialized tool;
a cup-like base member configured to couple with the lid member by threaded engagement, the base member having an opening along its bottom surface for receiving the end of a fastener;
inserting a fastener through the opening and tightening the fastener against an object with sufficient force to secure the fastener to the object but still allow the base member to rotate about the fastener head;
inserting a specialized tool into the recess of the lid member;
attaching the lid member to the base member by rotating the specialized tool; and
further comprising positioning a washer between the base member and the object to facilitate rotation of the base member relative to the object.

18. The method of claim 17, further comprising removing the lid member with the same type of specialized tool to gain access to the fastener head.

19. The method of claim 17, wherein the object is a license plate.

20. The method of claim 17, wherein the fastener is a standard screw.

21. An anti-theft assembly comprising:
a lid member comprising a threaded lid member attachment portion and a specially formed recess for receiving a specialized tool;
a base member configured to be releasably coupled to the lid member, the base member comprising a base having an opening for receiving the end of a fastener, a wall extending from the base, and a threaded base member attachment portion along the wall, the base member and the lid member forming a cavity that receives and accommodates the end of the fastener;
at least one washer positioned within or outside of the base member; and
a fastener extending at least partially through the base member and into a fastened object, a head of the fastener positioned within the cavity formed by the base member and lid;
wherein the base extends alongside and underneath the fastener head and the at least one washer facilitates rotation of the base relative to the fastener head;
wherein the at least one washer comprises a first washer located inside the base member between the fastener head and the base, and a second washer located outside of the base member between the fastened object and the base.

22. An anti-theft kit comprising:
an anti-theft device comprising:
a lid member comprising a top surface that defines an outermost surface of the device, a threaded lid member attachment portion extending underneath the top surface, and a specially formed recess on the top surface for receiving a specialized tool;
a base member configured to be releasably coupled to the lid member, the base member comprising a base having an opening for receiving the end of a fastener, a wall extending from the base towards the lid member, and a threaded base member attachment portion along the wall configured to connect with the threaded lid member attachment portion;
wherein the base member and the lid member form a cavity that receives and accommodates the head of the fastener; and
a specialized tool adapted for use with the lid member;
wherein the anti-theft device further comprises a washer positioned within the base member and alongside the base of the base member;
further comprising a second washer positioned outside of the base member and alongside the base of the base member.

23. The kit of claim 1, wherein the lid member is shaped such that no portion of an outwardly-facing side surface of the lid member extends in a direction parallel to an axis of rotation of the lid member relative to the base member.

24. A method of preventing theft of a fastener comprising:
providing an anti-theft device comprising:
a generally rounded lid member having a recess along a top portion for receiving a specialized tool;
a cup-like base member configured to couple with the lid member by threaded engagement, the base member having an opening along its bottom surface for receiving the end of a fastener;
inserting a fastener through the opening and tightening the fastener against an object with sufficient force to secure the fastener to the object but still allow the base member to rotate about the fastener head;
inserting a specialized tool into the recess of the lid member;
attaching the lid member to the base member by rotating the specialized tool; and
further comprising positioning a washer between the fastener and the base member to facilitate rotation of the base member relative to the fastener.

* * * * *